United States Patent Office 2,915,518
Patented Dec. 1, 1959

2,915,518

MONOAZO-DYESTUFF INSOLUBLE IN WATER

Ernst Fischer, Offenbach (Main), Germany, assignor to Farbwerke Hoechst Aktiengesellschaft vormals Meister Lucius & Brüning, Frankfurt am Main, Germany, a corporation of Germany No Drawing. Application July 9, 1957
Serial No. 670,633

Claims priority, application Germany July 19, 1956

1 Claim. (Cl. 260—203)

The present invention relates to a new monoazodyestuff insoluble in water, more particularly it relates to a dyestuff corresponding to the following formula:

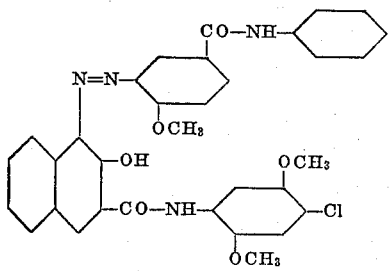

I have found that a valuable monoazo-dyestuff insoluble in water is obtained by coupling the diazonium compound of 1-amino-2-methoxybenzene - 5 - carboxylic acid phenylamide with 1-(2',3'-hydroxynaphthoylamino)-2,5-dimethoxy-4-chlorbenzene.

The dyestuff can be prepared in substance or on the fiber and yields bright bluish red shades. The dyestuff prepared in substance can be applied to textile materials by padding or printing in the presence of binding agents. It may also be used for the production of spun dyed acetate and viscose rayon by incorporating it in the spinning solutions.

The new dyestuff is also suitable for the production of color lakes and may be incorporated in masses from cellulose esters or ethers for the manufacture of colored films. Furthermore, it may be used for coloring natural and synthetic resins, such as the condensation products of formaldehyde with urea, phenols or amines, as well as for coloring rubber and polyvinyl compounds.

German Patent No. 889,739 describes the use of dyestuffs of similar constitution for the production of dyeings and printings which are resistant to plasticizers. The new dyestuff is, in general, distinctly superior to the dyestuffs described in the cited patent with regard to the fastness to solvents, to oil and to overspraying of the color lakes prepared with these dyestuffs and has a better fastness to bleeding into undyed polyvinyl chloride. It is especially superior to the dyestuff described in Example 4 of said patent, which is obtained by coupling the same diazonium compound as is used in the process of the present invention with 1-(2',3'-hydroxynaphthoylamino)-2,4-dimethoxy-5-chlorobenzene.

As compared with the dyestuff described in Example 2 of German Patent No. 899,538 which is obtainable by coupling the diazonium compound of 1-amino-2-methoxy-benzene-5-carboxylic acid amide with 1-(2',3'-hydroxy-naphthoylamino) - 2,5 - dimethoxy - 4 - chlorobenzene, the new dyestuff shows a considerably less bleeding of the textile dyeing in the fastness tests to washing and to peroxide.

The following examples serve to illustrate the invention but they are not intended to limit it thereto, the parts being by weight.

EXAMPLE 1

12.1 parts of 1-amino-2-methoxybenzene-5-carboxylic acid phenylamide are diazotized in the usual manner. In order to remove the excess of mineral acid sodium acetate is added to the diazo solution which is then stirred into an aqueous suspension of 17.9 parts of 1-(2',3'-hydroxy-naphthoylamino)-2,5-dimethoxy - 4 - chlorbenzene, prepared by dissolving this compound in dilute caustic soda solution and reprecipitating it with acetic acid. When the coupling is complete, the dyestuff which is rapidly formed at a temperature of 40° C. is filtered off, washed well and dried. It represents a red powder which can be used for the production of pigment prints on textile materials by one of the usual methods, for example by using an emulsion of polyvinyl acetate and the water-soluble hardenable condensation product of urea with formaldehyde. The print so obtained has a bright red tint and possesses good fastness properties, especially a very good fastness to light.

When the dyestuff is used for the production of color lakes, bright bluish red tints of a good fastness to oil, to solvents and to overspraying as well as a very good fastness to light are obtained. The coupling can also be carried out in the presence of a substratum adapted for the production of color lakes.

The colorations obtainable by incorporating the pigment dyestuff in polyvinyl chloride possess a very good fastness to bleeding with respect to the uncolored polymerization product and they have a very good fastness to light.

EXAMPLE 2

100 grams of cotton yarn are treated for 30 minutes at 35° C. in 2 liters of the following impregnation bath, the material is centrifuged and the dyeing is then developed in the wet state at 20° C. in the developing bath described below. The material is rinsed, soaped first at 60° C., then at boiling temperature, and dried.

Impregnation bath 9 grams of 1-(2',3'-hydroxynaphthoylamino)-2,5-dimethoxy-4-chlorobenzene are dissolved in 27 cc. of denatured alcohol, 3 cc. of sodium hydroxide solution of 38° Bé., 3 cc. of a solution of formaldehyde of 33% strength and 9 cc. of water and the solution is made up to 2 liters with water of 35° C., 10 grams of Turkey red oil of 50% strength and 20 cc. of sodium hydroxide solution of 38° Bé.

Developing bath 4.8 grams of 1-amino-2-methoxybenzene-5-carboxylic acid phenylamide are diazotized, while cooling, in 30 cc. of water with 9.6 cc. of hydrochloric acid of 15° Bé. and 1.6 grams of sodium nitrite dissolved in water; the solution is then made up to 2 liters by adding cold water and 20 grams of sodium acetate.

A bright bluish red dyeing of good fastness to boiling and to light is obtained.

I claim:
The water-insoluble monoazo-dyestuff corresponding to the following formula
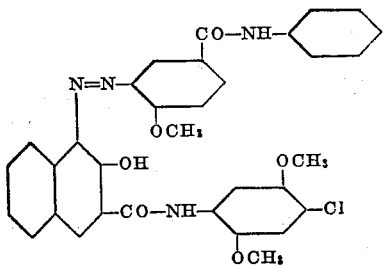
References Cited in the file of this patent
UNITED STATES PATENTS
| | | |
|---|---|---|
| 1,522,089 | Wagner et al. | Jan. 6, 1925 |
| 2,257,216 | Zerweck et al. | Sept. 30, 1941 |
| 2,792,385 | Fischer et al. | May 14, 1957 |
FOREIGN PATENTS
| | | |
|---|---|---|
| 889,739 | Germany | Sept. 14, 1953 |
| 899,538 | Germany | Dec. 14, 1953 |